No. 709,847. Patented Sept. 23, 1902.
J. L. CREVELING.
MEANS FOR DRIVING GENERATORS BY POWER TAKEN FROM CAR AXLES.
(Application filed Sept. 11, 1901.)
(No Model.) 2 Sheets—Sheet 1.
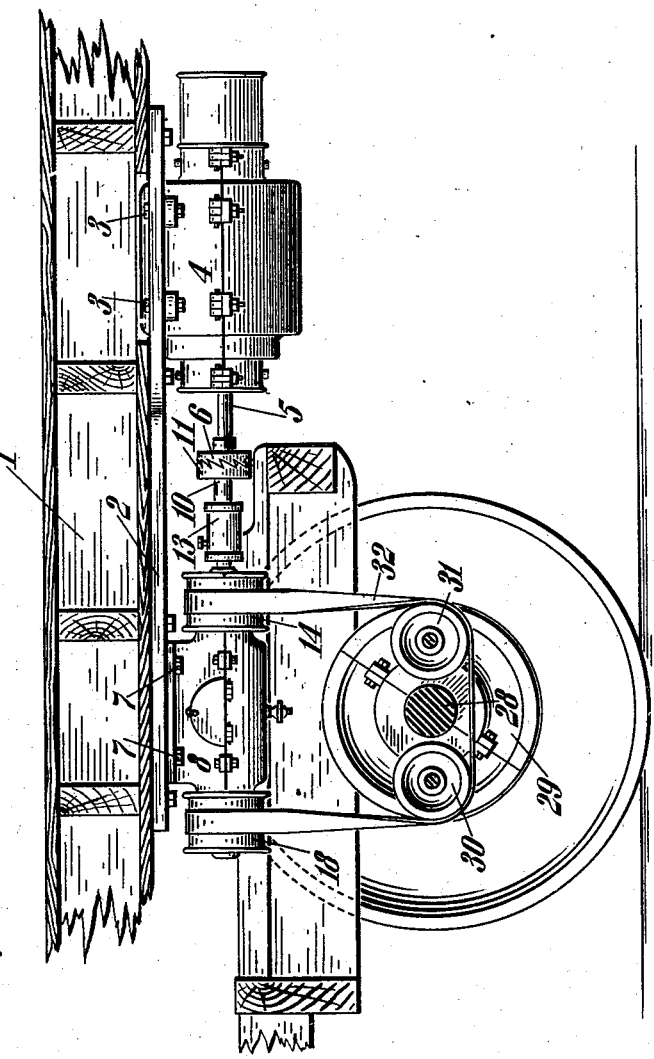
WITNESSES: INVENTOR:

No. 709,847. Patented Sept. 23, 1902.
J. L. CREVELING.
MEANS FOR DRIVING GENERATORS BY POWER TAKEN FROM CAR AXLES.
(Application filed Sept. 11, 1901.)
(No Model.) 2 Sheets—Sheet 2.
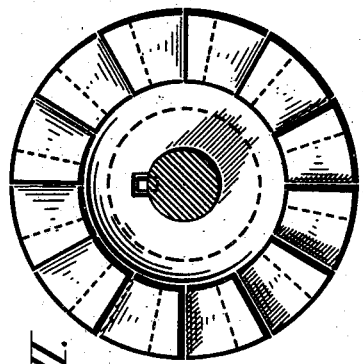
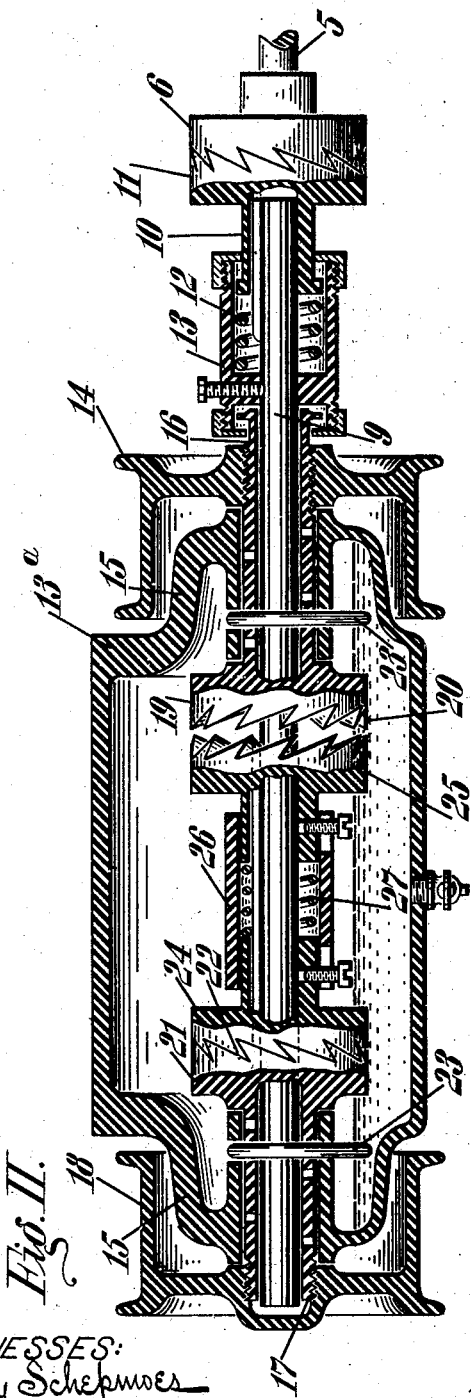
WITNESSES:
INVENTOR:
John L. Creveling
By
Jameson Crain Emley & Perkins
His attorneys

UNITED STATES PATENT OFFICE.

JOHN L. CREVELING, OF NEW YORK, N. Y.

MEANS FOR DRIVING GENERATORS BY POWER TAKEN FROM CAR-AXLES.

SPECIFICATION forming part of Letters Patent No. 709,847, dated September 23, 1902.

Application filed September 11, 1901. Serial No. 75,014. (No model.)

*To all whom it may concern:*

Be it known that I, JOHN L. CREVELING, a citizen of the United States, residing at New York city, borough of Manhattan, county and State of New York, have invented certain new and useful Improvements in Means for Driving a Generator by Power Taken from a Car-Axle, of which the following is a specification.

My invention relates to means for driving a generator by power taken from a car-axle or other source of motion liable to reversals in direction.

My invention will be described with particular reference to a system of electrical generation carried by a railroad-car; but it will be obvious that the invention is capable of use in other relations.

In the accompanying drawings I have shown the invention embodied in a system of generation carried by a railway-car.

In the drawings, Figure I is a side view of an apparatus in which my invention is embodied. Fig. II is an enlarged sectional view of the clutch mechanism, and Fig. III is a face view of one member of the clutch.

The salient features of the invention will be hereinafter claimed.

In the drawings, 1 represents the floor of the car-body, beneath which is supported a bed-plate 2. This bed-plate is bolted beneath the car-body and is provided with means, such as bolt-holes, whereby the generator and clutch mechanism may be mounted thereon in definite fixed relations to each other, so that in case of damage either to the generator or the clutch mechanism the damaged mechanism may be removed and replaced by the duplicate thereof. This avoids the necessity of making delicate adjustments, which are always difficult to make when carried on beneath a car. The provision of this bed-plate is a distinct improvement upon the prior art, as it entirely obviates the necessity heretofore existing of making delicate adjustments, it being merely necessary to remove the fastenings of the apparatus to be replaced to remove the apparatus and replace it by a duplicate, which may then be connected up to the remainder of the apparatus without trouble.

Suspended from the frame or bed-plate 2, as by suitable bolts 3, is a generator of electricity 4, provided with a shaft 5, having one member 6 of a coupling secured thereto.

Suspended from the frame or bed-plate, as by bolts 7, is a reversible clutch apparatus 8, provided with a shaft 9, carrying a sleeve 10, to which a coupling member 11 is secured, which member 11 coöperates with the coupling member 6. A spring 12, surrounding the shaft 9 and contained within the box 13, bears against the sleeve 10 and serves to hold the coupling member 11 yieldingly in engagement with the member 6, but separable therefrom. It will be observed that the teeth of the members of this coupling engage with each other and are so disposed with respect to each other as to permit the dynamo-shaft to run freely in one direction independently of the shaft 9 and driving-gear. This coupling has a threefold function. First, it couples the driving-shaft 9 to the armature-shaft 5, so that the dynamo-shaft will be driven from the shaft 9; second, it is separable, so that the belt may be spliced up and passed therethrough, the coupling being opened for this purpose and placed around the pulleys; third, the generator may run ahead as a motor independently of the driving-shaft, so that no harm will be done in case of the happening of such an event.

The shaft 9 extends entirely through the casing $13^a$ of the clutch mechanism 8 and carries sleeves 16 17, having mounted thereon pulleys 14 15, having inwardly-turned flanges adapted to serve as dust-guards, since they surround and run close to the ends 15 of the casing $13^a$.

The sleeves 16 17 are not rigidly connected to the shaft 9, but each is adapted to run free thereof. The sleeve 16 carries a clutch member 19, provided with teeth 20. These teeth 20 are in the nature of ratchet-teeth, and both faces are adapted to exert a cam action upon similarly-shaped teeth.

The sleeve 17 carries a clutch member 21, having teeth 22, similar in shape to the teeth 20. The casing $13^a$ is provided with an oil-bath, and lubricating-rings 23 are preferably provided in order to lubricate the bearings. A clutch member 24, mounted to rotate with the shaft, but to have a slight longitudinal movement thereon, coöperates with the clutch member 21, and a clutch member 25, also mounted to rotate with the shaft 9 and having a free longitudinal movement thereon, is adapted to coöperate with the clutch member 19. A sleeve 26 surrounds the shaft at portions of the clutch members and incloses a spring 27, which bears upon each clutch member so as to control the movement thereof longitudinally of the shaft. The operation of this portion of the apparatus will be hereinafter described.

Mounted upon the car-axle 28 is a suitable sheave or pulley 29, and mounted upon depending brackets (not shown) are pulleys 30 31. A belt 32 passes beneath the sheave or pulley 29, thence over the pulley 18, thence under the pulleys 30 31 and over the pulley 14. The direction of movement of the belt will be dependent upon the direction of movement of the car, and as the car is liable to have its direction of movement reversed and as it is required to have the direction of movement of the generator always the same the clutching apparatus 8 is provided for maintaining the direction of the movement of the generator always the same.

The generator is preferably of the shunt-wound type.

The mode of operation of the device is as follows: In the position in which the parts are shown the car is supposed to be moving toward the left, thereby rotating the pulley 18 and sleeve 17 in the direction in which the teeth 22 point. The teeth 22, meshing with the teeth of the clutch member 24, serve to rotate the said clutch member in the direction in which the teeth 22 point, and thereby correspondingly rotate the shaft 9. At this time the clutch member 19 is being rotated in a direction opposite to the direction in which its teeth 20 point. When the direction of the movement of the car is reversed, the direction of movement of the pulleys 14 and 18 will also be reversed, so that the clutch member 21 will turn in a direction opposite to that in which it formerly rotated—that is to say, in a direction opposite to the direction in which its teeth point. The clutch member 19 will thereupon be rotating in the direction in which its teeth point. The effect of this reversal of direction of rotation will be first to cause the outer surfaces of the teeth 22 to exert a cam action against the teeth of the clutch member 24, and thereby force the clutch members 24 and 25 laterally to the right until the teeth of the clutch member 25 engage with the teeth of the clutch member 19. As soon as this occurs the undercut cam-faces of the teeth of the clutch members 19 and 25 will cause the clutch member 19 to draw the clutch member 25 firmly into engagement therewith, and thereby cause the shaft 9 to be driven by the pulleys 14 in the same direction as before. When the direction of movement of the car is again reversed, the clutch member 24 will be forced into engagement with the clutch member 21 in the same manner. Thus no matter in what direction the car is running the shaft 9 and the generator 4 will always be driven in the same direction. The clutch member 24 is entirely out of engagement when the clutch member 25 is engaged, and vice versa. This is an important feature, as the disengaged clutch member will run idly and the engaged clutch member will always remain in engagement so long as the direction of rotation is not reversed regardless of starts and stops, thus avoiding wear. The spring 27 also performs the important function of allowing either clutch member to yield laterally in case its teeth should contact with the teeth of its complemental member before the teeth of the other set of members have been disengaged.

Having described my invention, what I claim, and desire to secure by Letters Patent, is—

1. The combination of a movable vehicle and bed-plate or frame secured thereto, a generator and a driving-gear, embodying a pulley intermediate the generator and the support for the driving-gear, means for securing the generator and driving-gear to the bed-plate in operative positions fixed with respect to each other, and a shaft and disengageable coupling or connection 11 intervening between the generator and the driving-gear, and an endless belt, whereby either the generator or the driving-gear may be removed from the structure and replaced by a duplicate without the necessity of readjustment of the parts, and the coupling may be separated in order that the belt may be placed around the pulley without disturbing the relations of the parts.

2. The combination of a bed-plate or frame secured to a car, a generator and its driving-gear and means for supporting the generator and driving-gear from the car in fixed operative relation to each other from the common bed-plate or frame, an endless belt, a separable coupling intervening between the generator and driving-gear and a pulley driven from the car-axle, the said endless belt connecting the said pulley and driving-gear.

3. The combination of a car and generator supported thereby, an endless belt receiving motion from the motion of the car and a driving-gear also supported by the car, and a freely-disengageable coupling or connection intervening between the driving-gear and the generator which when separated affords an opening for the passage of the endless belt.

4. The combination of a source of power liable to reversals in direction of movement, a direct-connected generator and a driving-gear therefor driven from the source of power aforesaid and connected by a separable clutch and a single endless belt whose direction of movement follows the direction of movement of the reversible source of power, and which may be passed through the separable clutch, the said driving-gear being organized to drive the generator in a single direction, notwithstanding reversals in direction of movement of the belt.

5. The combination of a generator, a source of power whose direction of motion is liable to reversals, a driving-gear intervening between the source of power and the generator, and embodying in its structure a plurality of clutches adapted to communicate motion in one direction only to the generator, irrespective of the reversals of the direction of movement of the source of power, one of the said clutches by its engagement causing complete disengagement of the other.

6. The combination of a car, a generator, and belt deriving its movement from the rotation of the axle of the car, and a suitable shaft provided with a plurality of clutches each comprising separable parts and means for separating the parts of one clutch by the engagement of the parts of the other clutch.

7. The combination of a generator and a driving-gear comprising in its structure a plurality of automatic clutches deriving motion from a single belt, one of the clutches being entirely disengaged and the other engaged during the entire time that it is in service or until a reversal of movement of the belt takes place.

8. The combination of a generator and a driving-gear comprising in its structure a plurality of connected clutch members only one of which is in driving engagement at a time, the other being entirely disengaged, and a spring device forming part of the connection between the clutches and acting upon the said clutch members to permit either to yield.

9. In a driving-gear the combination of a shaft and a plurality of clutches coöperating therewith, and adapted to be driven in opposite directions and each subject to reversals of motion and means whereby disengagement of one clutch causes the engagement of the other.

10. The combination of a generator having a rotary shaft, a driving-gear having a rotary shaft adapted to be driven in one direction only irrespective of reversals of the driving power, and a clutch or coupling serving to transmit motion from one of the shafts to the other in one direction only whereby the generator may be rotated in one direction without affecting the driving-gear clutch mechanism.

11. The combination of a generator and driving-gear and a clutch or coupling intervening between the said generator and driving-gear having means adapted to be engaged or disengaged by the relative direction of rotation of the respective shafts of the generator and driving-gear.

12. The combination of a generator and a driving-gear therefor, comprising in its structure a shaft, a plurality of separable clutches coöperating therewith and means whereby one clutch entirely disengages the other clutch by motion derived from its own engagement.

13. The combination of a generator and a driving-gear therefor comprising in its structure driving clutch members, a shaft, clutch mechanism fixed upon the shaft to revolve therewith and having a lateral motion thereon to engage the driving clutch members.

14. The combination of a generator and a driving-gear therefor, comprising in its structure a shaft, a plurality of separable clutches and a plurality of coöperating pulleys rotatable in opposite directions, and means whereby the rotation of one pulley will cause lateral movement and engagement of a laterally-movable member of the clutches with the other pulley.

15. The combination of a generator having a rotary shaft, a driving-gear having a rotary shaft adapted to be driven in one direction only irrespective of reversals of the driving power and a clutch or coupling serving to transmit motion from one of the shafts to the other in one direction only whereby the driving-gear may be rotated in one direction without rotating the armature.

16. The combination of a generator and driving-gear arranged in fixed operative relation to each other, and a driving-pulley and an endless belt transmitting motion from the driving-pulley to the driving-gear, of a disengageable coupling 11 connecting the generator and driving-gear and permitting the application of an endless belt, substantially as described.

In testimony whereof I have signed my name to this specification in the presence of two subscribing witnesses.

JOHN L. CREVELING.

Witnesses:
LINDSLEY SCHEPMOES,
F. E. KESSINGER.